United States Patent [19]

Voges, Jr. et al.

[11] Patent Number: 4,599,819
[45] Date of Patent: Jul. 15, 1986

[54] DECOY DABBLER

[75] Inventors: Alan M. Voges, Jr., 1614 Fairy Dell Tr.; Gregory L. Voges, Voges Apt. #8, both of Lookout Mtn., Tenn. 37350

[73] Assignees: Greg Voges; Alan Voges, both of Lookout Mtn., Tenn.

[21] Appl. No.: 791,794

[22] Filed: Oct. 28, 1985

[51] Int. Cl.⁴ .......................................... A01M 31/06
[52] U.S. Cl. ................................................ 43/3; 43/2; 446/154
[58] Field of Search ................. 43/3, 2; 446/154, 330, 446/359, 361, 364

[56] References Cited

U.S. PATENT DOCUMENTS

| 2,252,795 | 8/1941 | Weems et al. | 43/3 |
| 2,457,295 | 1/1944 | Woodhead | 43/3 |
| 2,595,966 | 5/1952 | Majors | 43/3 |
| 3,927,485 | 12/1975 | Thorsnes | 43/3 |
| 4,056,890 | 11/1977 | Dembski | 43/3 |

Primary Examiner—Nicholas P. Godici
Assistant Examiner—Karen Skillman

[57] ABSTRACT

A duck decoy moving device consisting of a decoy pulling line attached to an encased spring which is anchored at one end. The decoy pulling line is pulled and released, extending and retracting the spring, giving the attached duck decoys a realistic movement on the surface of the water. This also gives the appearance of movement to the surrounding unattached duck decoys due to the movement produced on the surface of the water.

1 Claim, 3 Drawing Figures

DECOY DABBLER

SUMMARY OF THE INVENTION

The object of this invention is to create a wave-like motion on the surface of the water which gives not only the attached duck decoys but the surrounding duck decoys a life-like appearance.

The primary advantage of this invention is when duck hunting in a little or windless situation. This gives a moving appearance to otherwise motionless decoys.

The encased spring which is anchored and submerged provides the back and forth movement of the duck decoys attached to the decoy pulling line when it is pulled and released.

The mechanics of the invention are illustrated in the drawings supplied and described in the detailed description of the invention.

DETAILED DESCRIPTION OF THE INVENTION

This is a detailed description of the invention. It should be noted that the members in the attached figures labled A, B and C are not part of the invention but to be provided by the user.

Figure 1:
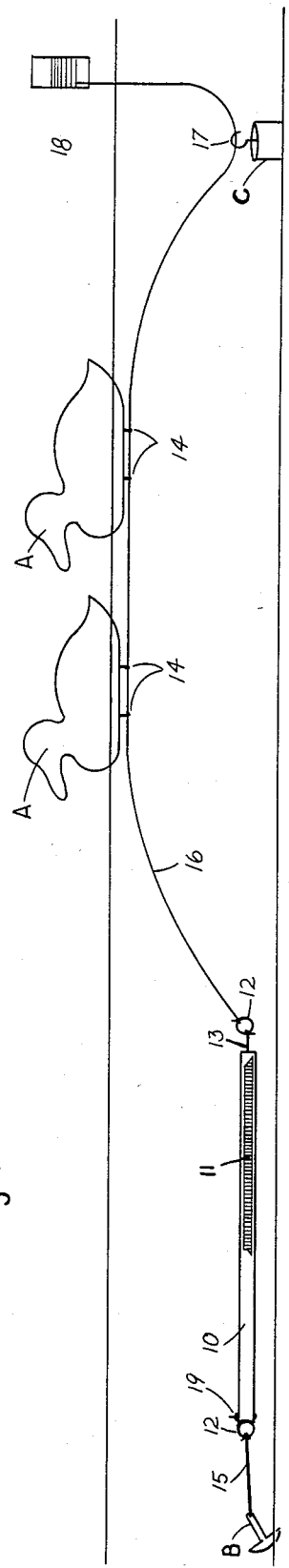
FIG. 1 is a side view of the duck decoy moving device set up in an actual duck hunting situation.

Referring to FIG. 1, the distal end of the duck decoy moving device is anchored to B by the attached anchor line 15 which is attached to the distal metal ring 12. The distal metal ring 12 is fastened to the distal end of the spring 11 and secured by the nut and bolt 19. The spring 11 is encased in the CPVC tube 10.

Figure 2:
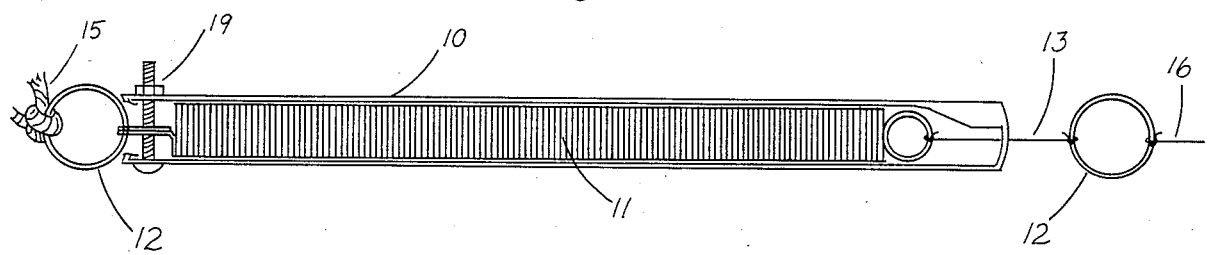
FIG. 2 is a detailed enlargement of the encased spring shown in FIG. 1. This shows the position of the spring in the CPVC tube.

Referring to FIG. 2, the proximal end of the spring 11 is attached to the metal wire 13. This metal wire 13 prevents possible fraying of the decoy pulling line 16. The metal wire 13 is attached to another metal ring 12 at the proximal end. The proximal ring 12 is attached to the decoy pulling line 16. The CPVC tube 10 is long enough to prevent the spring 11 from protruding from the tube 10 even when the spring 11 is extended.

Figure 3:
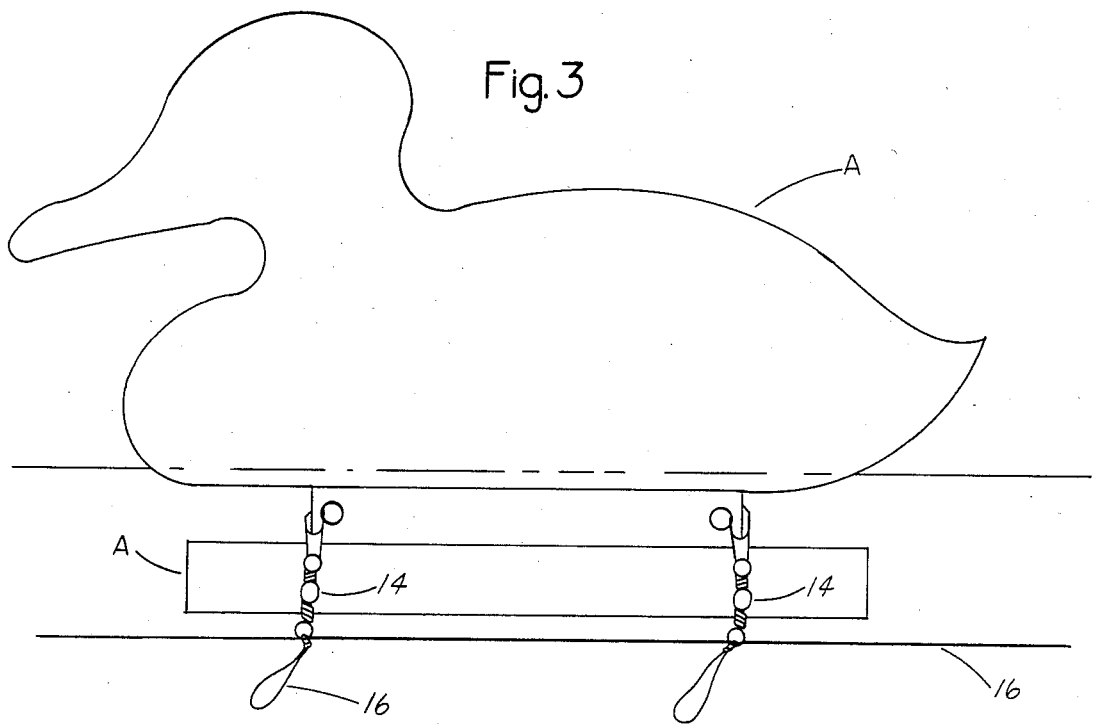
FIG. 3 is a view of one of the decoys attached by the two swivels to the decoy line.

Referring to FIG. 3, each duck decoy A is attached to the decoy pulling line 16 by two attached metal swivels 14. These metal swivels 14 can be adjusted along the decoy pulling line.

Referring back to FIG. 1, the decoy pulling line 16 is submerged by the metal hook 17 which is anchored by C. The remainder of the decoy pulling line is wrapped around the wooden handle 18.

The operation of the device is as follows and can be followed best by referring to FIG. 1. The decoy pulling line 16 is pulled by the hunter by the handle 18. This pulls the attached decoys A and extends the encased spring (which remains submerged) toward the hunter. The duck decoys are moved approximately two to five feet which is adjusted according to the distance pulled by the hunter. When the line 16 is released by the hunter, the encased spring 11 is retracted therefore pulling the duck decoys A back to the point of origin. When this extending and retracting of the spring 11 is repeated several times by pulling and releasing the decoy pulling line 16, it produces many ripples on the surface of the water due to the movement of the attached duck decoys A.

Except for the handle 18, the extra decoy pulling line 16, and the decoys A, the entire invention is always completely submerged. It is very portable and can be used by itself or with other unattached duck decoys.

This invention is very advantageous in a little or windless duck hunting situation because it produces movement of the water and surrounding duck decoys which are not attached to the invention. This gives a moving appearance to the otherwise motionless duck decoys.

We claim:

1. In combination a duck decoy and a decoy moving device comprising:
   an encased extendable and retractable spring;
   an anchor line attached to one end of said spring for anchoring said spring beneath the surface of a body of water;
   a decoy pulling line attached at one of its ends to the other end of said spring;
   at least one duck decoy fixedly attached to a mid-portion of said decoy pulling line and floating in the surface of said body of water;
   a handle attached to the other end of said decoy pulling line and positioned obove the surface of said body of water;
   wherein a pulling force applied to said handle causes said spring to extend and retract producing life-like movement of said duck decoy.

* * * * *